United States Patent [19]

Sztipanovits et al.

[11] Patent Number: 5,214,577
[45] Date of Patent: May 25, 1993

[54] AUTOMATIC TEST GENERATION FOR MODEL-BASED REAL-TIME FAULT DIAGNOSTIC SYSTEMS

[75] Inventors: Janos Sztipanovits; Csaba Biegl; Gabor Karsai; Samir Padalkar, all of Nashville, Tenn.; Nobuji Miyasaka, Toyonaka; Koji Okuda, Nishinomiya, both of Japan

[73] Assignee: Osaka Gas Co., Ltd., Osaka, Japan

[21] Appl. No.: 602,133

[22] Filed: Oct. 24, 1990

[51] Int. Cl.$^5$ .................... G05B 9/02; G06G 7/48
[52] U.S. Cl. ................... 364/184; 364/185; 364/551.01; 364/578; 371/23
[58] Field of Search ............ 364/149, 150, 151, 184, 364/185, 189, 550, 551.01, 578; 371/3, 23, 25.1; 395/904

[56] References Cited

U.S. PATENT DOCUMENTS 4,755,925  7/1988  Tsuchiya et al. .................. 364/150
4,878,179 10/1989  Larsen et al. ..................... 371/25.1

OTHER PUBLICATIONS

Padalkar et al, Proc. of the Fourth Conf. of Artificial Intelligence for Space Applns., pp. 115–124, 1988.
Sztipanovits et al, International Journal of Intelligent Systems, vol. 3, pp. 269–280, 1988.
Sztipanovits et al, Proceedings of the Third IEEE Conf. on Artificial Intelligence Applications, pp. 126–133, 1987.
Sztipanovits et al, Proceedings of the NASA/JPL Symposium on Telerobotics, pp. 131–139, 1987.
Biegl et al, Innovation et Technologie en Biologie et Medicine, vol. 10, No. 2, pp. 205–216, Feb. 1989.
Sztipanovits et al, Coupling Symbolic & Numerical Computing in Expert Systems, II, pp. 117–128, 1988.

Sztipanovits, Measurement, vol. 7, No. 3, pp. 98–108, Jul.–Sep. 1989.
Sztipanovits et al, Biomed Meas Infor Contr, vol. 1, No. 3, pp. 140–146, 1986.
Sztipanovits et al, IEEE/Seventh Annual Conf. of the Engineering in Medicine & Biology Society, pp. 1132–1136, 1985.
Sztipanovits, Proceedings of the IEEE International Symposium on Circuits & Systems, pp. 2359–2362, 1988.
Blokland et a., Proceedings of the American Control Conf. pp. 620–626, 1988.
Karsai et al, Proceedings of the American Control Conf., 1988.
Karsai et al, Proceedings of the IEEE Symposium of Intelligent Control, pp. 4650–4656, 1988.
Sztipanovits et al, Robotics & Automation, May 1990.

Primary Examiner—Jerry Smith
Assistant Examiner—Paul Gordon
Attorney, Agent, or Firm—Hale and Dorr

[57] ABSTRACT

In a real-time diagnostic system, an alarm sequence generator is used to test the correctness of a fault model. The fault model describes an industrial process being monitored. The alarm sequence generator reads the fault model and generates a user interface, from which specific components can be selected for failure at specified times. The alarm sequence generator assembles all alarms that are causally downstream from the selected set of faulty components and determines which alarms should be turned on based on probabilistic and temporal information in the fault model. The timed alarm sequence can be used by an expert to measure the correctness of a particular model, or can be used as input into a diagnostic system to measure the correctness of the diagnostic system.

8 Claims, 7 Drawing Sheets

AUTOMATIC TEST GENERATION FOR MODEL-BASED REAL-TIME FAULT DIAGNOSTIC SYSTEMS

BACKGROUND OF THE INVENTION

The present invention relates in general to real-time fault diagnostic systems, and more particularly to an automatic test generation method for ensuring the operational correctness and resolution of a fault model in a real-time diagnostic system.

In complex industrial processes, a computerized fault diagnostic system is frequently used to monitor alarms and detect possible sources of failure in the industrial process. Real-time fault diagnostic systems observe the operation of processes, detect the appearance and propagation of faults, and continuously update the list of possible fault causes to support the on-line decision making which determines whether to intervene in the process being monitored.

The ultimate purpose of the diagnostic system is to minimize the cost of operation of the industrial process being monitored by finding all possible sources of detected process anomalies as early as possible, and by predicting the prospective adverse economic effect which can be caused by the faults on the operation of related process components. These techniques are particularly applicable in chemical and power engineering because of the extreme expense of down-time and the adverse economic effect which can be caused by a degradation of product quality.

Thus, a diagnostic system is frequently used to monitor extremely complex industrial operations, such as in a chemical or power plant. A typical industrial operation can have thousands of components performing hundreds of operations at any given time. Many of these operations are interdependent, and constantly interact with each other. The failure of any one component can potentially affect adversely the performance of other operations that do not directly use the failed component. Therefore, a single component fault can effectively propagate to many other operations, and set off many different alarms.

Previous systems employ both symptom-based and model-based categories of real-time diagnostic methods. Symptom-based diagnostic methods collect failure symptoms and try to match them with a particular symptom pattern which is characteristic of a possible failure cause. The symptom-failure cause association may be found using pattern recognition methods, deterministic reasoning, or probabilistic reasoning. The main disadvantages of the symptom-based diagnostic methods are that the association is highly dependent upon operational conditions, and that a reliable diagnosis requires the presence of well-developed symptoms, which are not tolerable in most industrial applications. These disadvantages are caused in symptom-based diagnostic systems in part because the number of possible symptoms that are generated by different failure modes can be prohibitively large.

Model-based methods provide much better performance than symptom-based methods, but can only be used when detailed information about the structure of the system being monitored is available. In model-based methods, a model of the industrial process is generated prior to operation of the system, and is used during the diagnostic process to locate the possible failure sources. Different types of models, including quantitative models, qualitative models, and graph models, can be used in the diagnostics. The application of graph models in large scale systems has been most promising, mainly because of the predictable computation load of the applied graph algorithms.

Many model-based diagnostic methods are known in the prior art. However, the results of the diagnosis in terms of accuracy and resolution are determined in part by the accuracy and resolution of the model itself. A correct and more detailed model will lead to better results than will be obtained by a model that contains errors and that is not as detailed.

It therefore an object of the present invention to test the accuracy and completeness of failure propagation model for use in a diagnostic system. It also an object of the present invention to test a failure propagation model by simulating fault scenarios for a component or set of components in the process to be monitored.

SUMMARY OF THE INVENTION

The general alarm sequence generator of the present invention uses a model-specific alarm script to simulate specific timed alarm sequences. The alarm script is automatically synthesized from a fault model which describes the process being monitored, and is stored in a disk file. The synthesis procedure converts fault specific information found in the model as causal, temporal and probabilistic relationships, to an alarm script representation. After the alarm script is created, the general alarm sequence generator reads it and generates a user interface that can be used to specify failures, for test purposes, in one or more components.

The user selects a set of components to fail, and the time that each is to fail. The method, using the selected components, assembles all the alarms that are causally downstream from (affected by) the selected set of faulty components. The method uses probabilistic information in the fault model and operational state information to determine which alarms should be turned on. The method also uses temporal information from the fault model to determine the time that the alarm should be turned on. The resulting timed alarm sequence is a prediction of the alarms that would result from a given set of failed components. Therefore, the resulting alarms, when compared with an expert's prediction of which alarms will be triggered as a result of the fault, can be used to measure the correctness of a particular model. The timed alarm sequence can also serve as the input to the diagnostic system, and its results can be used to measure the resolution of the fault model as well as the correctness of the diagnostic system.

BRIEF DESCRIPTION OF THE DRAWINGS

Other objects, features and advantages of this invention will appear from the following description of a preferred embodiment, taken together with the drawings in which.

DETAILED DESCRIPTION OF THE PREFERRED EMBODIMENT

Figure 1:
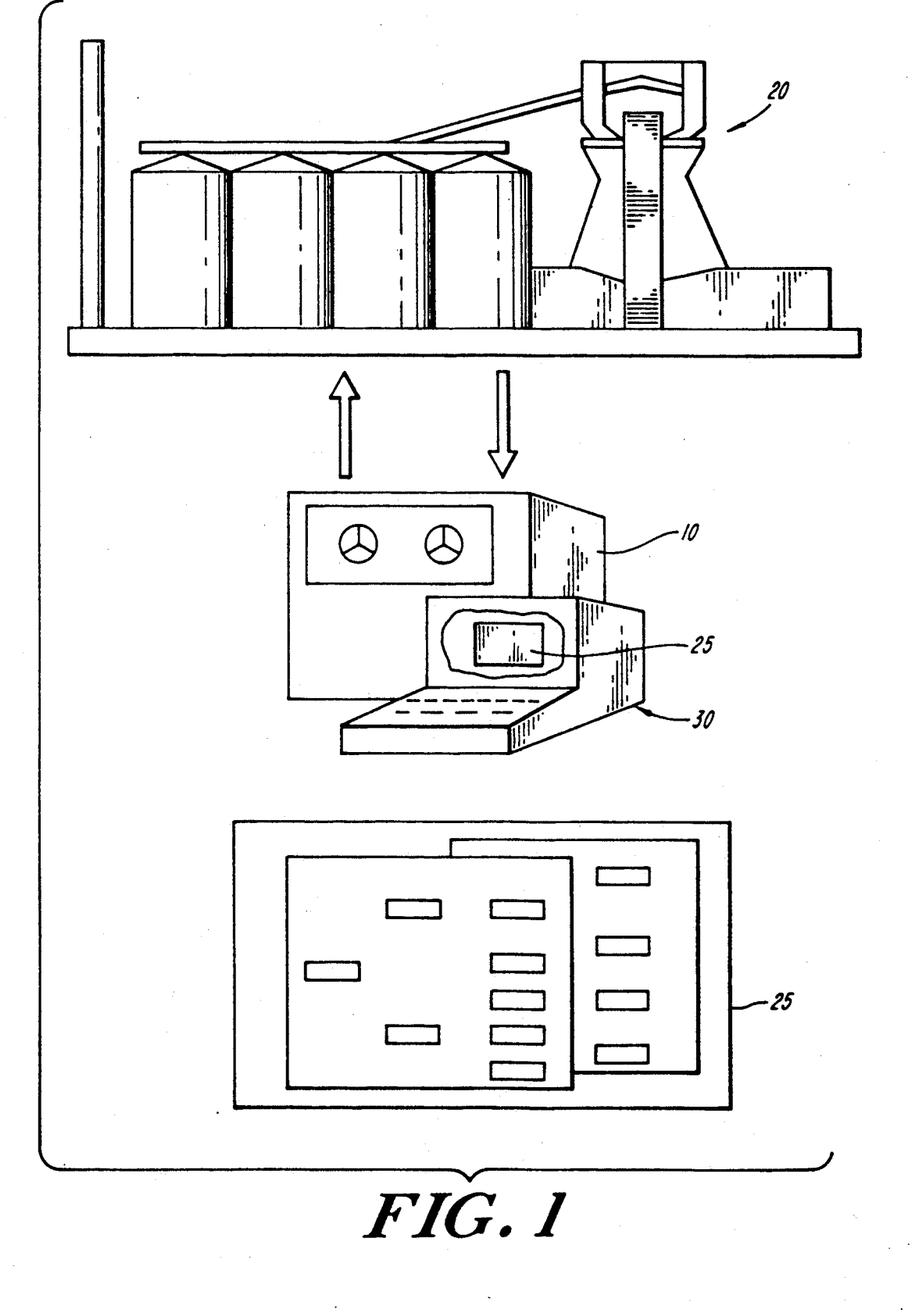
FIG. 1 is a representation of the application environment of the system.

Referring to FIG. 1, a system for automatic test generation of the present invention is used with a model-based diagnostic system 10 used to monitor an industrial process 20. The model-based diagnostic system monitors both on-line and off-line alarm sources and identifies possible failure source components in the industrial process. The potential failure source components are displayed to the operator on a display 30.

Figure 2:
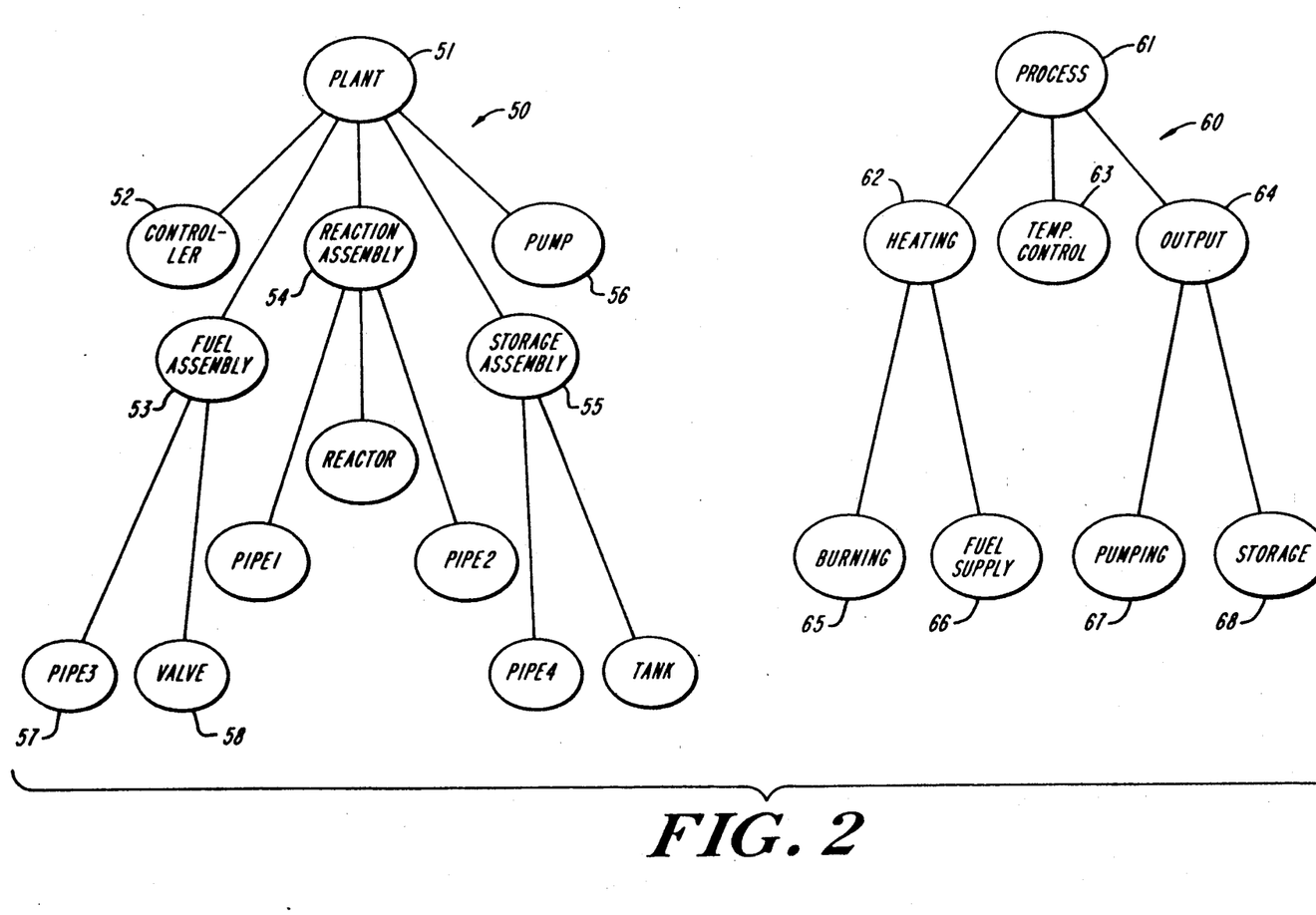
FIG. 2 is an example of a component hierarchical model and an operations hierarchical model.

In the preferred embodiment of the present invention, the diagnostic system is based on a hierarchical fault model which uses a directed graph to represent fault nodes and fault propagation paths between plant components and plant operations. The plant components and the plant operations are represented in a hierarchy which is derived from the structural models of plant components and operations respectively. Referring to FIG. 2, an example of a component hierarchical model 50 and an operations hierarchical model 60 is shown. The plant component hierarchy is a hierarchical decomposition of the components present within the plant. The plant operations hierarchy is a hierarchical decomposition of the operations being performed within the plant.

Each hierarchical model consists of nodes (denoted by the circular shapes in the figure) connected by fault propagation paths (the connecting lines in the figure). The fault propagation paths represent how a fault, which occurs at one node, can propagate through the industrial process. Each fault propagation path is characterized by the upper and lower limit of the propagation time, and by the propagation probability.

Figure 3:
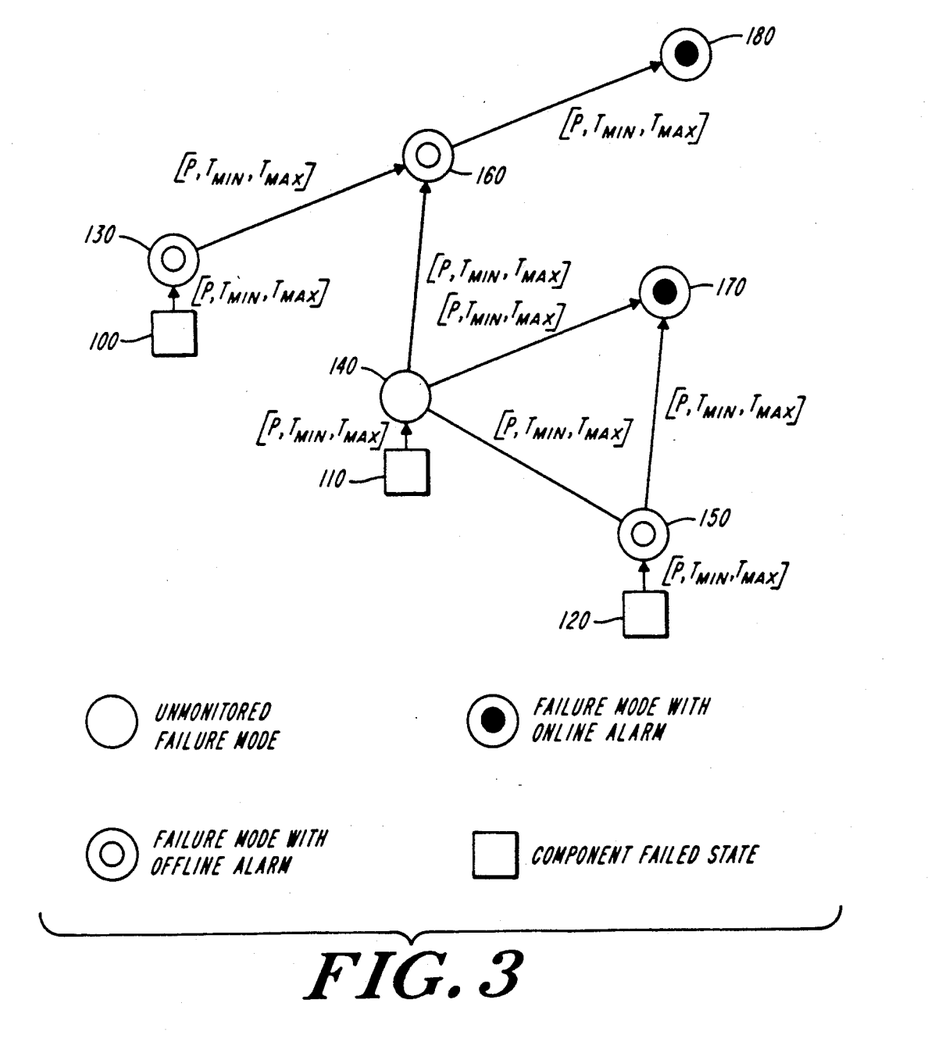
FIG. 3 is an example of an operation failure propagation model.

Referring to FIG. 3, an exemplary operation failure propagation model has three components 100, 110, 120 with a failed state. The model shows those nodes 140 without alarms, nodes 130, 150, 160 with off-line alarm sources, and nodes 170, 180 with on-line alarm sources. A fault occurring at component 110 can propagate, according to the graph representation of the model, along several paths, for example: from 110 to 140 to 160 to 180; from 110 to 140 to 170; and from 110 to 140 to 150 to 170. As noted above, associated with each path 190, is a probability of occurrence (P) and the minimum and maximum propagation time (T min, T max).

Figure 4:
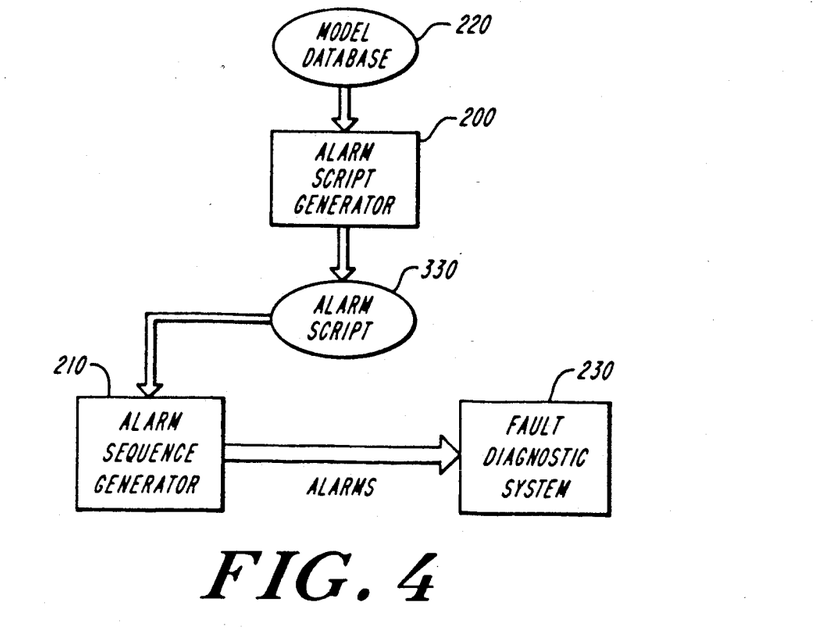
FIG. 4 is a block diagram of the test generation system of the present invention.

Referring to FIG. 4, the test generation system of the present invention is divided into two principle sub-methods—an alarm script generator 200, and a generic alarm sequence generator 210. The alarm script generator 200 extracts the relevant fault information from a plant model database 220, and stores it as an alarm script 230. The generic alarm sequence generator 210 reads the alarm script, creates its model-specific internal data structures, and generates a user interface, and sends the appropriate alarms, at designated times, to the fault diagnostic system.

In the illustrated embodiment of the test generation system, the system generates a user interface that displays all primitive components (that is, components without any sub-components), and all operations, in graphic form. Graphically-displayed objects representing components can be controlled using a "mouse", and specific components in the graphic display can be selected to display information about that component. A specific operation can also be selected, in which case the particular states of that operation are displayed.

When using the fault simulation program of the present invention, the user can select a specific component for failure, any number of failed-states for a component, and the time that the component should fail. The user is also able to select the current state of an operation. When a component fails, its various failed-states are displayed The failure simulation test method causes the component failure to take place at the designated time. Any number of components can be selected in this manner.

After a current state has been selected for all operations and one or more components have been selected for failure, the user starts the current simulation. The alarm sequence generator determines and assembles all the alarms that are causally downstream from the selected set of faulty components and causes them to activate at the appropriate time (dependent upon the propagation times).

Thus, the probabilistic information found in the fault model and the operational state information is used in determining the actual set of alarms that will be turned on. Temporal information found in the fault model is used to determine when the alarm would be turned on. The alarms are ordered according to their calculated time and an alarm dispatcher sends each alarm to the diagnostic system in the order and the time calculated for simulation.

Alarm Script Generator

The alarm script generator 200 initially obtains the relevant characteristics of the plant model from the failure propagation model database 220. The information obtained includes the number of failure nodes, the number of alarms, the number of components, and the number of operations. Further, information about the characteristics of the plant model is then obtained from the model and is stored as follows:

A. Failure-Nodes

For each Failure Node:
(1) Identifier of the failure-node.
(2) Identifier of operation containing the failure-node.
(3) Identifier of the parent of operation containing the failure-node.
(4) Name of the failure-node.
(5) Name of the operation containing the failure node.
(6) Number of alarms associated with the failure node, and for each alarm associated with the failure node:
(a) Identifier of the alarm associated with each failure node.
(b) Number of parent operation states in the failure-node alarm association. The attribute to be stored for each state is its identifier.
(7) Number of outgoing paths associated with failure-node.

For each outgoing path associated with the failure node:
(a) Identifier of the descendent failure-node.
(b) Fault propagation probability.
(c) Fault propagation minimum time.
(d) Fault propagation maximum time.

(e) Number and identifier of the parent operation states.

B. Alarms

For each alarm:
(1) Identifier of alarm.
(2) Type of alarm as either ONLINE or OFFLINE.
(3) Identifier of port alarm.

C. Operations
(1) Identifier of the operation.
(2) Name of the operation.
(3) Number of states, and
for each state:
  i. Identifier of the state.
  ii. Name of the state.
  iii. Identifier of the port of the state.

D. Physical Components.
(1) Identifier of the component.
(2) Name of the component.
(3) Number of failed-states of the component.
For each failed state:
  (i) Identifier of the failed-state.
  (ii) Name of the failed-state.
  (iii) Number of outgoing paths of failed-state, and for each outgoing path:
    i. Identifier of the descendent failure-node.
    ii. Fault propagation probability.
    iii. Fault propagation minimum time.
    iv. Fault propagation maximum time.
(4) Status of the component as PRIMITIVE or COMPOUND.

Figure 5:
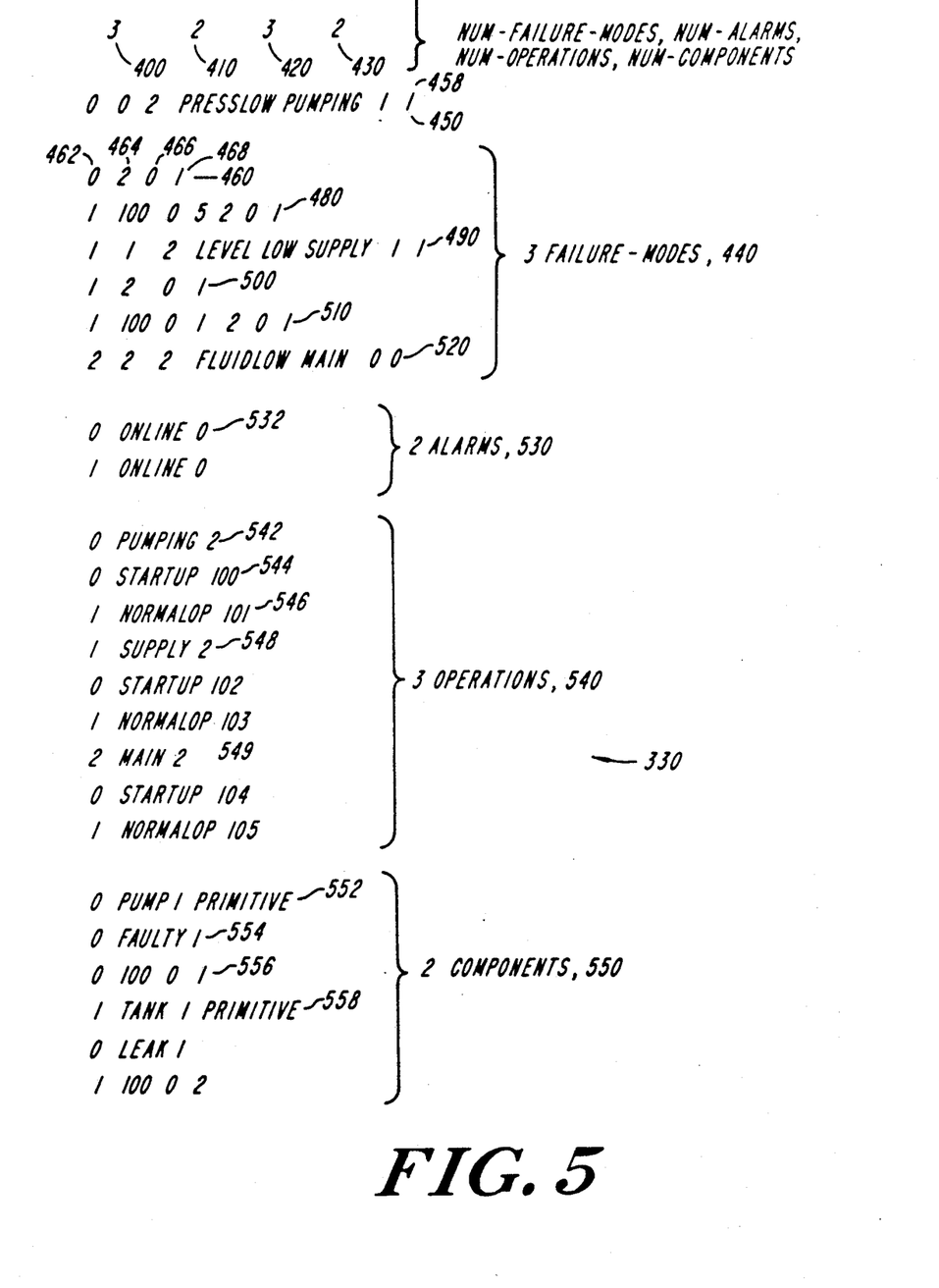
FIG. 5 is a an example of a generated alarm script file.

FIG. 5 shows an example of a generated alarm script file that would be generated by the Alarm Script Generator. The first element 400 of the first line is the number of failure nodes in the system. The second element 410 corresponds to the number of alarms, the third element 420 is the number of components, and the last element 430 is the number of operations.

The next group of elements 440 is information about each of the failure nodes. The first line 450 of this line contains the identifier of the first failure-node ("0"), the identifier of the operation containing failure node ("0"), the identifier of parent of operation containing failure-node ("2"), the name of failure-node ("PressLow"), the name of the operation containing the failure node ("Pumping"), the number of alarms associated with failure node ("1"), and the number of outgoing paths 458 associated with the failure node ("1").

The next line 460 gives details of the alarm associated with the failure node. In this example, there is only one alarm associated with the failure node, so there is only one line of details. The first element 462 of line 460 is the identifier ("0") of the alarm associated with the failure node. The second element 464 of line 460 is the number ("2") of parent operation states in the failure node alarm association. The third element 466 and last element 468 are the identifiers ("0" and "1") for each of the parent operation states (as given in 464).

Line 480 gives details for each of the outgoing paths associated with the failure node specified by the last element 458 in line 450. Here, there was only one outgoing path, so there is only one line of corresponding detail. The details specified in line 480 are the identifier of descendent failure-node ("1"), the fault propagation probability ("100"), the fault propagation minimum time ("0"), the fault propagation maximum time ("5"), the number of the parent operation states ("2") and the identifiers of the parent operation states ("0", "1").

Lines 490 and 520 contain information about the second and third failure nodes, respectively. Line 500 contains details of the alarm associated with the second failure node and line 510 contains details of the outgoing edges associated with the second failure node.

The next group of information 530 corresponds to the alarms. The number of alarms ("2") had been given in the second element 410 of the first line. There is one line of information for each alarm. A first line 532 contains information about the first alarm. The first element is the identifier of the alarm ("0"), the second element is the type of alarm ("ONLINE"), and the last element is the identifier of the port alarm ("0"). The second line contains similar information for the second alarm.

The third group of information 540 corresponds to the operations. The number of operations ("3") had been given in the third element 420 of the first line. The first line of this group contains the identifier of the operation ("0"), the name of the operation ("PUMPING"), and the number of states of the operation ("2").

The second line 544 contains information about the first state of the operation, and the next line 546 contains the information about the second state of the operation. The first element of the second line is the identifier of the first state ("0"), followed by the name of the state ("STARTUP"), and the identifier of the port of the state ("100"). The third line contains the same information, but for the second state.

The fourth line 548 of the operations data contains information about the second of the three operations. This line is followed by two lines of state information, one for each state as given in line 548.

Likewise, line 549 contains information about the third of the three operations and is followed by state information for each of the states given in line 549.

The last group 550 of information contains information for each of the components. The number of components ("2") was given in the first line of the alarm script file. The first line 552 contains the identifier of the component ("0"), the name of the component ("PUMP"), the number of failed-states of the component ("1"), and the status of the component ("PRIMITIVE").

The second line 554 of the components data corresponds to information about the first of the failed states of the component. The first element gives the identifier of the failed state ("0"), the second element is the name of the failed state ("FAULTY"), and the last element is the number of outgoing paths of the failed state ("1").

The third line 556 of the components data contains information for the number of outgoing paths as specified in line 554. The first element of this line is the identifier of the descendent failure node ("0"). The second element is the fault propagation probability ("100"), the third element is the fault propagation minimum time ("0"), and the last element is the fault propagation maximum time ("1").

Line 558 of the components data contains information about the second of the two components. This line is likewise followed by information for each of the failed states of the component and for each of the outgoing paths of each of the failed states.

The Alarm Script Generator 200 generates information derived from the failure propagation model in this way and creates the alarm script file 230, which will be used by the Alarm Sequence Generator.

Alarm Sequence Generator

Figure 6:
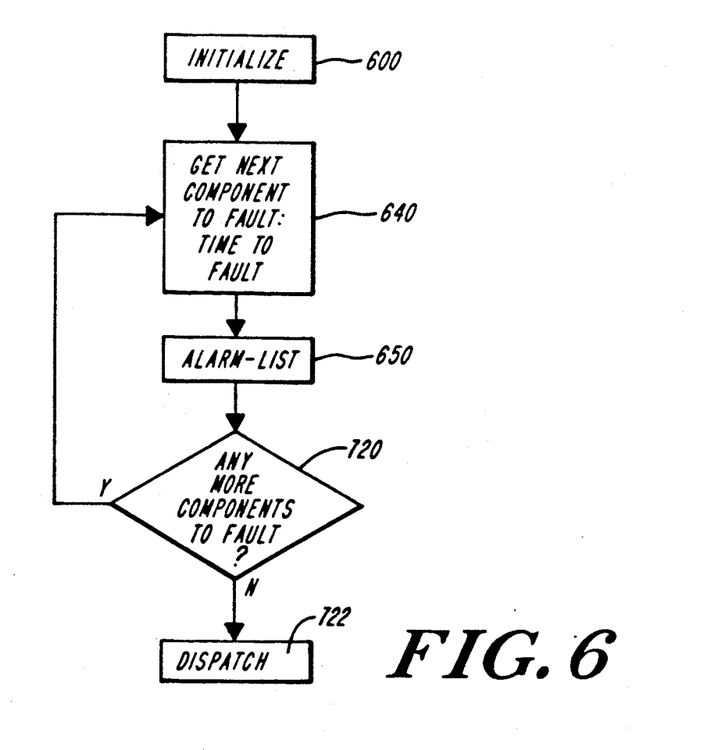
FIG. 6 is a flow chart of the alarm sequence generator main program.
Figure 7:
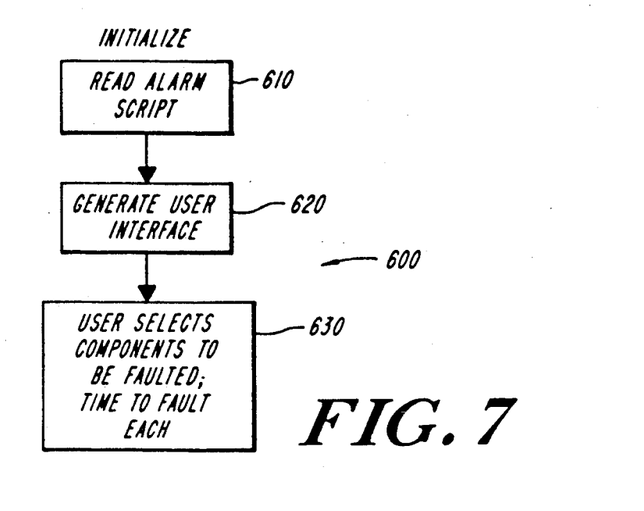
FIG. 7 is a flow chart of the "Initialize" procedure.

Referring to FIG. 6, the alarm sequence generator 210 first initializes at 600, as shown in more detail in FIG. 7. Referring to FIG. 7, the alarm script file is read at 610, and the user interface is generated at 620. The user selects, at 630, a current state for all operations, the set of components to be faulted, and the times that each component is to fail.

Referring again to FIG. 6, the system calls the "Alarm-List" procedure, at 650, for each component that the user has selected to be faulted (which is fetched at 640). The "Alarm-List" procedure, referring to FIG. 8, begins at the failed component and steps through the failure propagation graph, node by node, determining whether a fault would propagate from one node to another, and if so, at what time the fault would propagate.

Figure 8:
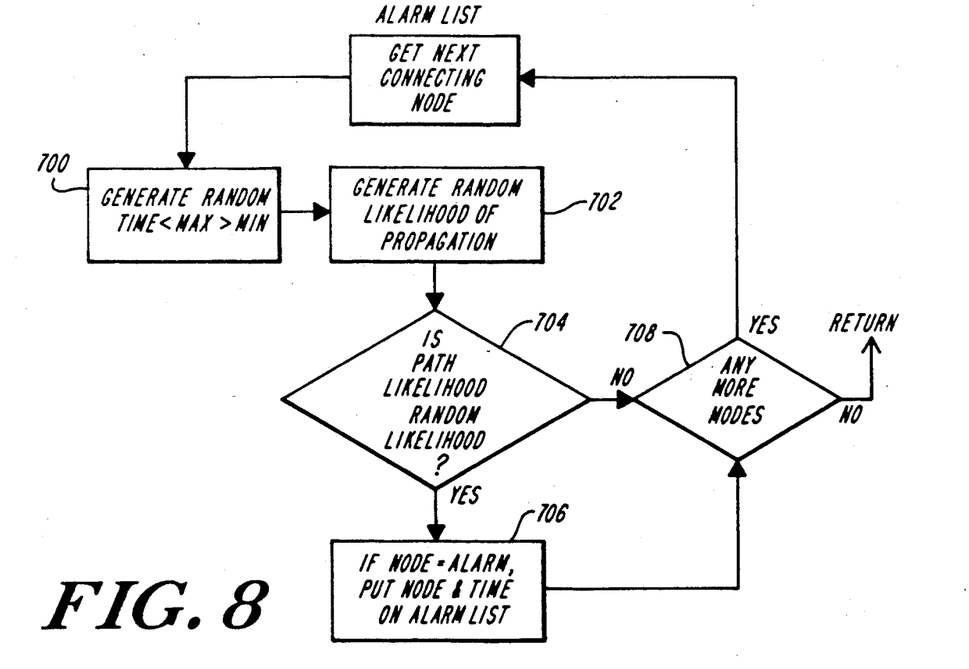
FIG. 8 is a flow chart of the "Alarm-list" procedure.

To determine the time that a fault would propagate along a path, the system dynamically generates, at 700, a random number having a uniform probability of occurrence between the minimum fault propagation time and the maximum fault propagation time as defined in the failure propagation graph. The system then dynamically generates (at 702) a random number, also with a uniform probability density, between 0 and 1, and tests, at 704, whether the fault propagation probability as defined in the failure propagation graph is greater than or equal to the random probability. The fault will only propagate if the defined probability is greater than or equal to the randomly-generated probability. If the fault is to propagate, the system places, at 706, the node and time of occurrence on the alarm list if the node has an on-line alarm. If the test at 704 is not true, the system continues to the next node (tested at 708) or otherwise returns to the operation illustrated on FIG. 6.

Figure 9:
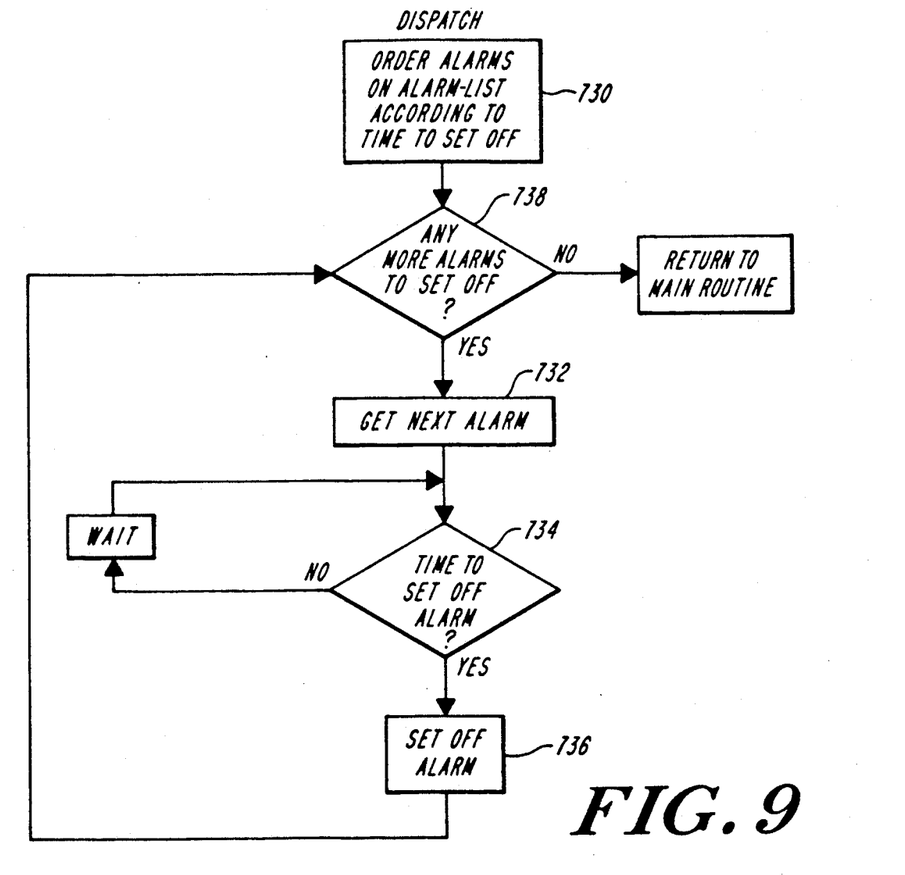
FIG. 9 is a flow chart of the "Dispatch" procedure.

After the system determines which alarms to set off and what time each should be set off for all fault components, as tested at 720, it calls the DISPATCH procedure, ay 722, which is shown in greater detail in FIG. 9. The DISPATCH procedure first orders, at 730, the alarms on the alarm-list according to the time at which the alarms should be set off. It then sets off each alarm, if it is not already set off, when the specified time is reached by fetching at 732, the next scheduled alarm, looping at 734 until the scheduled time is reached, setting off the alarm at 736, and testing at 738 for further alarms on the ordered alarm list.

The Automatic Test Generation program of the present invention therefore will produce a set of alarms, at the appropriate times, for any combination of failed components selected by the user. The resulting timed alarm sequence is a prediction of the alarms that would result from a given set of failed components. Therefore, the resulting alarms can be compared with an expert's prediction about the likely behavior of the industrial process to measure the correctness of a particular model. The timed alarm sequence can also serve as the input to the diagnostic system, and its results can be used to measure the resolution of the fault model as well as the correctness of the diagnostic system.

While the foregoing invention has been described with reference to a preferred embodiment, it should be understood that various modifications and alterations will occur to those practiced in the art. Such modifications and alterations are intended to fall within the scope of the appended claims.

What is claimed is:

1. A method for testing the accuracy and completeness of a diagnostic system which analyzes the operation of a monitored process, the system being modeled as a graph model having
   a plurality of on-line nodes representing functions being monitored by a first group of alarms,
   a plurality off-line nodes representing functions being monitored by off-line alarms,
   a plurality of nodes representing functions of the monitored process not having alarms associated therewith,
   a plurality of nodes representing fault source components, and
   a plurality of propagation paths, wherein each said path selectively interconnects at least two said nodes for representing allowable propagation of information from one node to another,
   the method comprising the steps of specifying each node of the model at which data signals shall originate,
   specifying for each originating node a time at which the data signal shall originate,
   propagating said data signal through said graph model and along said propagation paths, said propagation paths being characterized by minimum and maximum propagation times, and a probability of propagation of said signals along said paths, and
   determining the nodes to which said data signal is propagated and the time of its arrival.

2. The method of claim 1 wherein said step of propagating said data signal along said propagation paths further comprises the steps of:
   generating a random time for each path that is not greater than said maximum propagation time and not less than said minimum propagation time for the propagation path; and
   propagating said data signal along each propagation path at a time specified by said random time.

3. The method of claim 1 wherein said step of propagating said data signal along said propagation paths further comprises the steps of:
   generating a random probability value of propagation; and
   propagating said data signal along said propagation path only if said generated random probability value has a specified desired relationship relative to said propagation probability for a path.

4. The method of claim 3 further comprising the step of:
   comparing a resultant data signal flow through said graph model with an expected data signal flow through said model for determining the accuracy of said graph model.

5. Apparatus for testing the accuracy and completeness of a diagnostic system which analyzes the operation of a monitored process, the system being modeled as a graph model having
   a plurality of on-line nodes representing functions being monitored by a first group of alarms,
   a plurality of off-line nodes representing functions being monitored by off-line alarms,
   a plurality of nodes representing functions of the monitored process not having alarms associated therewith,
   a plurality of nodes representing fault source components, and
   a plurality of propagation paths, wherein each said path selectively interconnects at least two said nodes for representing allowable propagation of information from one node to another, the apparatus comprising means for specifying each node of the model at which data signals shall originate, means for specifying for each originating node a time at which the data signal shall originate, means for propagating said data signal through said graph model and along said propagation paths, said propagation paths being characterized by minimum and maximum propagation times, and a probability of propagation of said signals along said paths, and means for determining the nodes to which said data signal is propagated and the time of its arrival.

6. The apparatus of claim 5 wherein said means for propagating said data signal along said propagation paths further comprises means for generating a random time for each path that is not greater than said maximum propagation time and not less than said minimum propagation time for the propagation path; and means for propagating said data signal along each propagation path at a time specified by said random time.

7. The apparatus of claim 5 wherein said means for propagating said data signal along said propagation paths further comprises:

means for generating a random probability value of propagation; and means for propagating said data signal along said propagation path only if said generated random probability value has a specific desired relationship relative to said propagation probability for a path.

8. The apparatus of claim 7 further comprising:

means for comparing a resultant data signal flow through said graph model with an expected data signal flow through said model for determining the accuracy of said graph model.

* * * * *